United States Patent
Karandikar et al.

(10) Patent No.: US 9,191,307 B2
(45) Date of Patent: Nov. 17, 2015

(54) METHOD FOR FAST CONNECTIVITY FAULT MANAGEMENT [CFM] OF A SERVICE-NETWORK

(75) Inventors: Abhay Karandikar, Mumbai (IN); Madaiah Vinod Kumar, Bangalore (IN)

(73) Assignee: TEJAS NETWORKS LTD, Bangalore (IN)

( * ) Notice: Subject to any disclaimer, the term of this patent is extended or adjusted under 35 U.S.C. 154(b) by 1081 days.

(21) Appl. No.: 12/811,820

(22) PCT Filed: Jan. 7, 2009

(86) PCT No.: PCT/IB2009/000008
§ 371 (c)(1),
(2), (4) Date: Jul. 6, 2010

(87) PCT Pub. No.: WO2009/087556
PCT Pub. Date: Jul. 16, 2009

(65) Prior Publication Data
US 2010/0281295 A1    Nov. 4, 2010

(30) Foreign Application Priority Data
Jan. 7, 2008 (IN) .............................. 55/CHE/2008

(51) Int. Cl.
| | |
|---|---|
| G01R 31/08 | (2006.01) |
| H04L 12/703 | (2013.01) |
| H04L 12/24 | (2006.01) |
| H04L 12/26 | (2006.01) |
| H04L 12/751 | (2013.01) |
| H04L 12/753 | (2013.01) |

(52) U.S. Cl.
CPC ............ *H04L 45/28* (2013.01); *H04L 41/0663* (2013.01); *H04L 43/0811* (2013.01); *H04L 45/02* (2013.01); *H04L 45/48* (2013.01)

(58) Field of Classification Search
None
See application file for complete search history.

(56) References Cited

U.S. PATENT DOCUMENTS

| | | | |
|---|---|---|---|
| 7,512,141 B2 | 3/2009 | Elie-Dit-Cosaque et al. | |
| 7,644,317 B1* | 1/2010 | Sajassi et al. | 714/43 |
| 8,174,992 B2* | 5/2012 | Farkas et al. | 370/242 |
| 2007/0140126 A1 | 6/2007 | Osswald et al. | |
| 2009/0003313 A1* | 1/2009 | Busch et al. | 370/352 |
| 2009/0161562 A1* | 6/2009 | Shah et al. | 370/245 |

FOREIGN PATENT DOCUMENTS

WO    WO 2008095538 A1 *  8/2008

OTHER PUBLICATIONS

Cisco Systems, "Ethernet Connectivity Fault Management," (2006), 76 pages.
Sharma et al., "Viking: A Multi-Spanning-Tree Ethernet Architecture for Metropolitan Area and Cluster Networks," *Proceeding of 23rd Conference IEEE Communications Society*, INFOCOM 2004 (2004), 12 pages.

\* cited by examiner

*Primary Examiner* — Christopher Crutchfield
*Assistant Examiner* — Thinh Tran
(74) *Attorney, Agent, or Firm* — Deborah Gador

(57) ABSTRACT

This invention is related to a method for Fast Connectivity Fault Management (CFM) of a service-network in the realm of Carrier Ethernet, comprises steps of: learning spanning tree topology of the service-network, exchanging Fast Connectivity Check Messages (Fast-CCM)s between the adjacent service-nodes of the tree, terminating the Fast-CCMs so received, to learn the fault, in the service-network, upon failure to receive a Fast-CCM through a service-port, and proactively notifying the fault by service nodes on either side of the faulty service-network.

11 Claims, 4 Drawing Sheets

METHOD FOR FAST CONNECTIVITY FAULT MANAGEMENT [CFM] OF A SERVICE-NETWORK

CROSS REFERENCE TO RELATED APPLICATIONS

Figure 1:
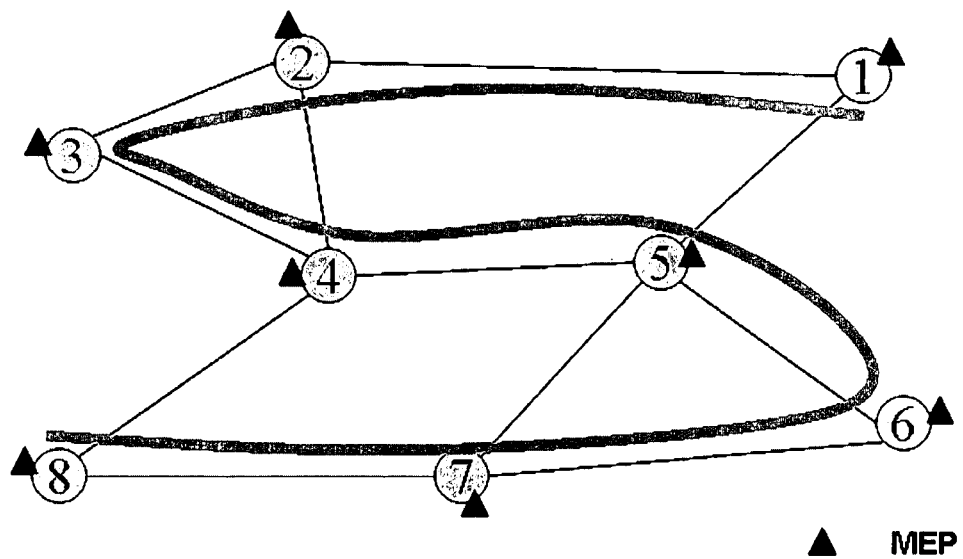

This application is a 35 USC §371 National Stage application of International Application No. PCT/IB2009/000008 filed Jan. 7, 2009, now pending; which claims the benefit under 35 USC §119(a) to India Patent Application No. 55/CHE/2008 filed Jan. 7, 2008. The disclosure of each of the prior applications is considered part of and is incorporated by reference in the disclosure of this application.

FIELD OF INVENTION

Instant invention is related to a method for Fast Connectivity Fault Management (CFM) of a service-network in the realm of Carrier Ethernet, comprises steps of learning spanning tree topology of the service-network, exchanging Fast Connectivity Check Messages (Fast-CCM)s between the adjacent service-nodes of the tree, terminating the Fast-CCMs so received, to learn the fault, in the service-network, upon failure to receive a Fast-CCM through a service-port, and pro-actively notifying the fault by service nodes on either side of the faulty service-network.

BACKGROUND OF THE INVENTION

IEEE 802.1ag discusses Connectivity Fault Management (CFM). CFM principles are explained in Clause 18 of 802.1ag.
  CFM functions are partitioned as follows:
  Path discovery or Link Trace Message
  Fault detection or absence of CCM
  Fault verification and isolation or Loop Back
  Fault notification
  Fault recovery
  CFM mandates that edge-nodes or Maintenance Association End Points (MEPs) exchange Connectivity Check Messages (CCM). Only MEPs process the CCMs. Intermediate nodes (and MIPs) only forwards the received CCMs. They don't generate or terminate any CCM. In the event of failure they might appear to terminate CCMs, but they do not process CCMs. If three consecutive CCMs are not received by the MEPs within a given time-interval then it implies that fault has occurred. LTM and LBM are used to isolate the faulty link or node. On successful fault isolation, lower service layer will try to restore the traffic using some legacy restoration mechanisms, e.g. UPSR, BLSR, STP, RSTP, MSTP, etc. If restoration at a particular service layer fails then higher service layer will be notified about the fault and this higher service layer will try to restore the traffic. And so on.

Using this mechanism, CFM helps carriers to locate two types of fault: physical failure and mis-configuration. Physical failure includes node and link failure whereas mis-configuration happens due to negligence on the part of the administrator.

OBJECTS OF INVENTION

The main object of the present invention is to develop a method for Fast Connectivity Fault Management (CFM) of a service-network in the realm of Carrier Ethernet.

Yet another object of the instant invention is learning spanning tree topology of the service-network, Still another object of the instant invention is exchanging Fast Connectivity Check Messages (Fast-CCM)s between the adjacent service-nodes of the tree.

Still another object of the instant invention is terminating the Fast-CCMs received by the service-nodes, Still another object of the instant invention is detecting fault if the Fast-CCM is not received by the service-nodes.

Still another object of the instant invention is pro-actively notifying the fault by the service-nodes on either side of faulty service-network.

STATEMENT OF INVENTION

Instant invention provides for a method for Fast Connectivity Fault Management (CFM) of a service-network in the realm of Carrier Ethernet, comprises steps of: learning spanning tree topology of the service-network, exchanging Fast Connectivity Check Messages (Fast-CCM)s between the adjacent service-nodes of the tree, terminating the Fast-CCMs received by the service-nodes, detecting fault if the Fast-CCM is not received by the service nodes and pro-actively notifying the fault by the service-nodes on either side of faulty service-network.

BRIEF DESCRIPTION OF ACCOMPANYING DRAWINGS

Figure 2:
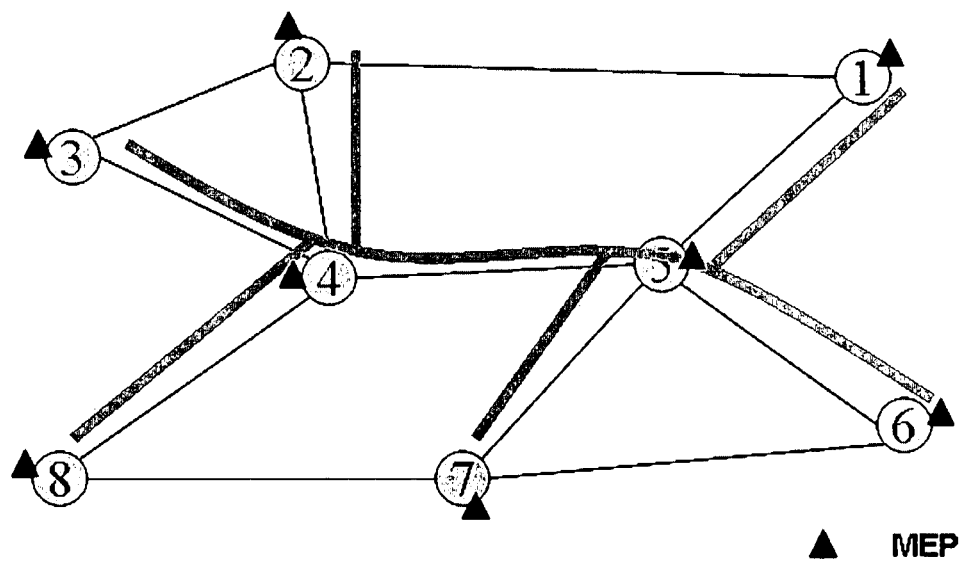
Figure 3:
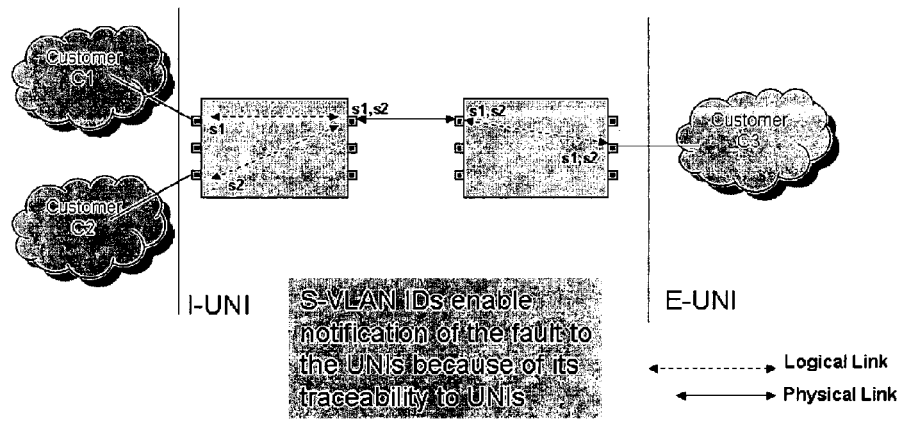
Figure 4:
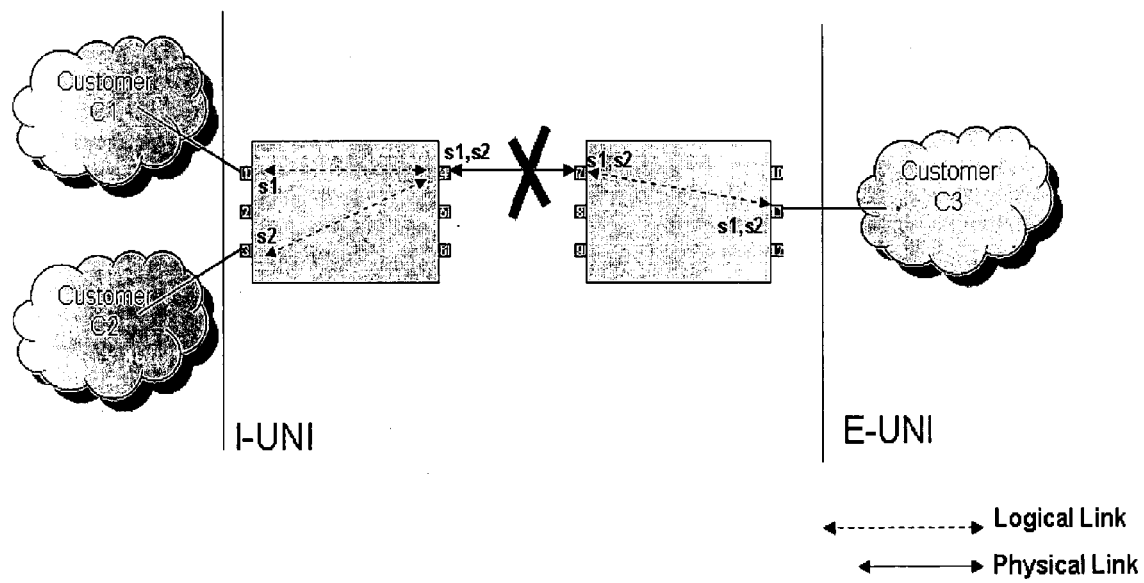
Figure 5:
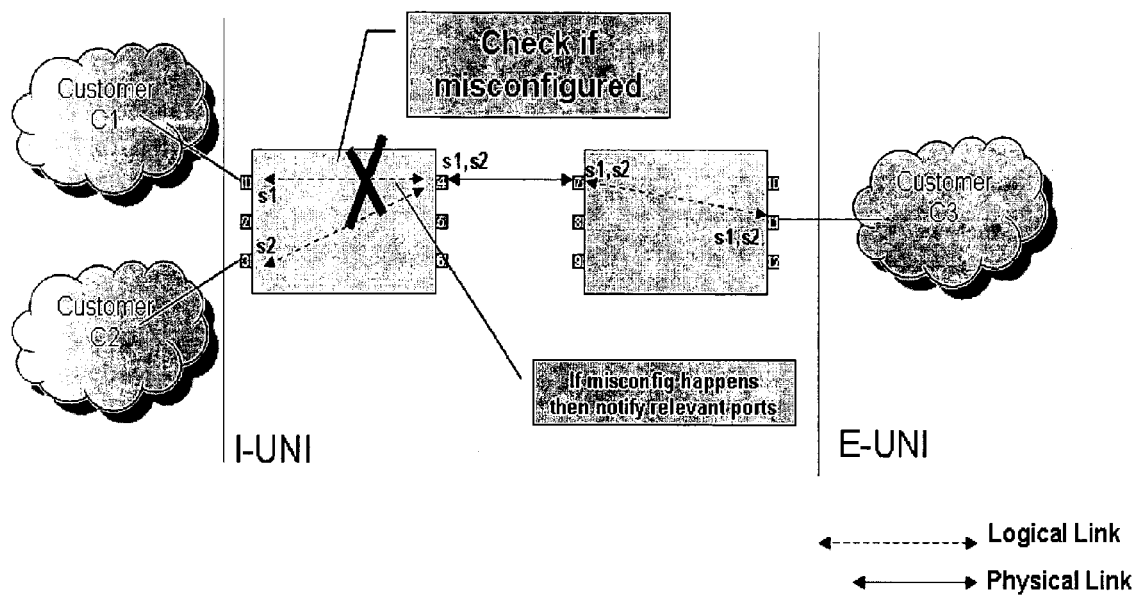
Figure 6:
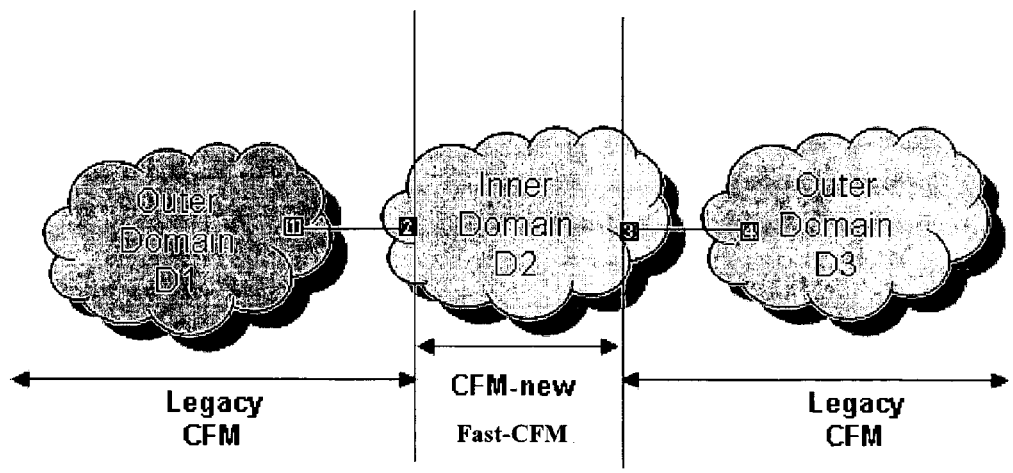
Figure 7:
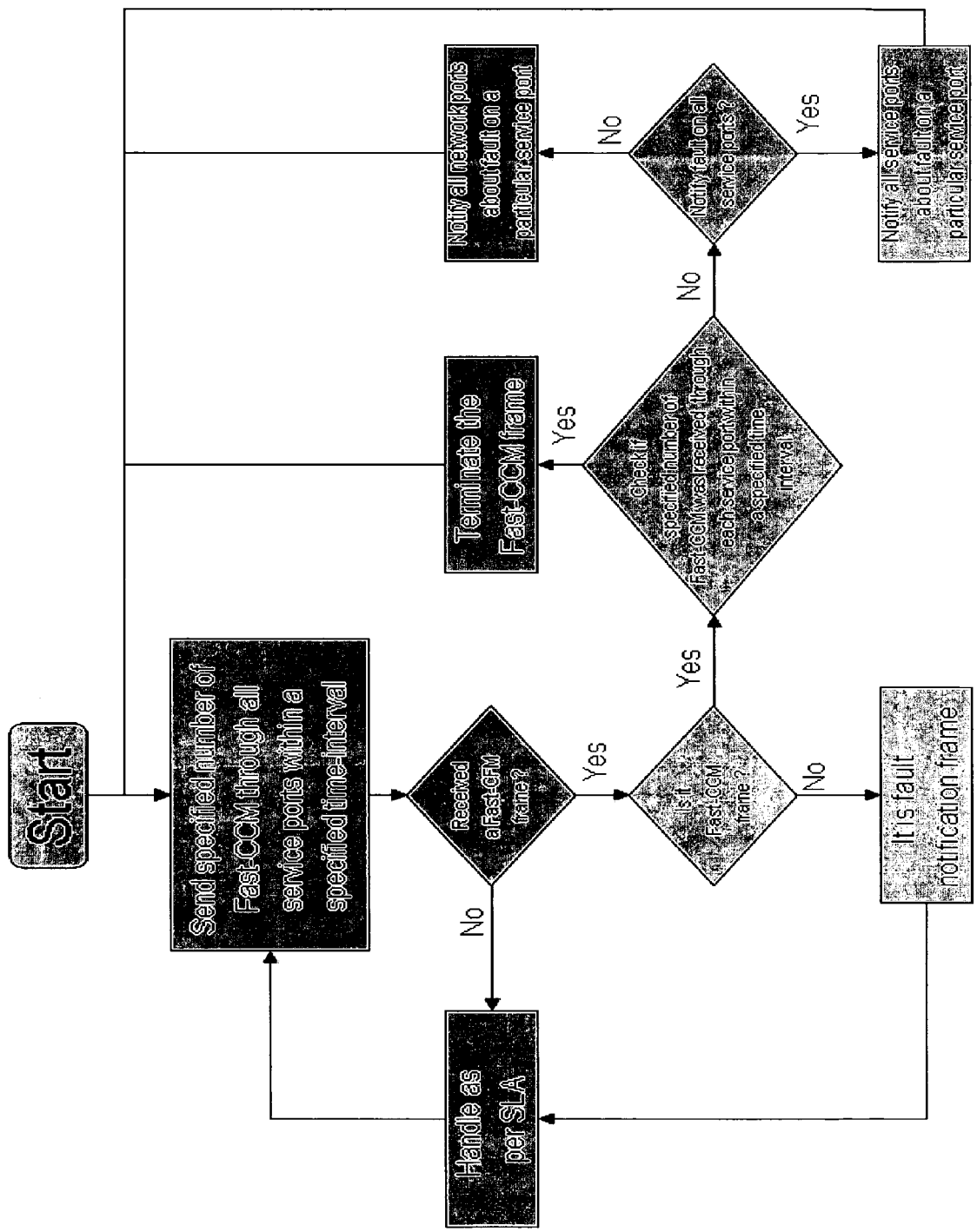

FIG. 1 shows spanning tree for example 1
FIG. 2 shows spanning tree for example 2
FIG. 3 shows MEF service
FIG. 4: MEF service example 1
FIG. 5: MEF service example 2
FIG. 6 shows interoperability with Legacy CFM
FIG. 7 shows Flow chart of Fast-CFM method

DESCRIPTION OF THE INVENTION

Accordingly, the present invention relates to a method for Fast Connectivity Fault Management (CFM) of a service-network in the realm of Carrier Ethernet, comprises steps of: learning spanning tree topology of the service-network, exchanging Fast Connectivity Check Messages (Fast-CCM)s between the adjacent service-nodes of the tree, terminating the Fast-CCMs received by the service-nodes, detecting fault if the Fast-CCM is not received by the service-nodes and pro-actively notifying the fault by the service-nodes on either side of faulty service-network.

In another embodiment of the present invention one Fast-CCM, one each in each direction, is exchanged at any point of time, within a specified time-interval, between the two adjacent service-nodes to provide for minimum bandwidth utilization.

In still another embodiment of the present invention providing the pro-active notification to the service-nodes affected due to the fault.

In still another embodiment of the present invention the pro-active notification is provided using the service-node table for traffic flow.

In still another embodiment of the present invention the method provides for detection, isolation and notification of node and/or link failure to the affected service-nodes.

In still another embodiment of the present invention the method provides for interoperability with known CFM, IEEE 802.1ag.

In still another embodiment of the present invention the method provides for reduced Link Trace Message (LTM) and Loop Back Message (LBM) traffic to recover from the fault.

In still another embodiment of the present invention the method increases the speed of recovery with minimal bandwidth usage compared to IEEE 802.1ag.

DEFINITIONS

Service-network: A network formed by bridge ports of the Layer 2 bridge network such that the Service Level Agreement (SLA) is met between all the participating UNIs. The network so formed consists of at least the following entities: MIP, MEP, Links, and Ports. A service-network is identified by VLAN IDs.

Service node: At least two of its port is member of service-network. Such port is called Service-port.

If a service-port is uni-directional then a service-node will have one ingress-port and one egress-port.

If a service-port is bi-directional then there will be two ingress-port and two egress-port on a service-node.

Service node could have MEP or MIP or both depending on service provisioning.

We discuss our method by few examples and finally we give flow-chart. The invention is further elaborated with the help of following examples. However these examples should not be construed to limit the scope of the invention.

Example 1

The FIG. 1 has eight service-nodes, with one MEP each, and one spanning tree. MIPs throughout the service spanning tree are not shown. The spanning tree shown connects all the eight nodes. If every MEP sends CCMs to every other MEP, then there is going to be exchange of 8 Multicast CCMs between a given MEP and the other MEPs. This is so because, for every sending MEP there are seven receiving MEPs. The sender sends one Multicast CCM to all other MEPs through the egress ports of the node; then the role gets reversed. The sender receives seven Multicast CCMs from other MEPs. The time interval between which a MEP should send a CCM is pre-specified and sometimes depends upon the type of service. Example, the time interval for voice call could be much smaller than for data traffic. Generalizing this example we see that for N node service-network, there is going to be exchange of N multicast CCMs between a given MEP and the other MEPs. From the figure, one can see that if the nodes learn the tree-topology of the service, and if node 8 receives CCMs from node 1 then, it will imply that all other intermediate nodes (numbered 2 to 7) are reachable. In the event of failure, if any node does not receive a CCM from either node 1 or node 8, then it will initiate LTM and LBM to isolate fault and to recover from it. CCM from intermediate nodes are not multicasted to other MEPs. All intermediate nodes snoop the CCMs to learn about the fault. Thus, we see that if functions of MEPs and service-nodes change depending on the spanning-tree topology then efficiency of CFM could be increased. That is, intermediate MEPs and nodes process information from the CCM that was snooped.

In this example, improvement with respect to snooping method is (8−2)/2*100=300%.

In general the improvement with respect to snooping method is (N−2)/2*100%.

The improvement is of the order of N ~O(N)

Question 1: Is it possible to achieve this improvement always?

Before answering this question, we look at one more example.

Example 2

The network topology in FIG. 2 is same as in the previous example. Only the service tree has changed. Node 4 will receive CCM from 2, 3, and 8 on the left side, 5, 1, 7, and 6 on the right side. Node 5 will receive CCM from 2, 3, 8, and 4 on the left side, 1, 7, and 6 on the right side. So CCMs are exchanged across link 4-5 eight times. As in example 1 of above, if nodes 1, 6 and 7 are reachable to nodes 2, 3 and 8, then it will imply that nodes 4 and 5 are reachable. So instead of exchanging 8 CCMs, one could have operational service-network with just 6 CCMs. Nodes 4 and 5 would snoop the CCMs and learn of the fault, if any. They will not generate CCMs. They will only forward the CCMs. Thus, we see that if functions of MEPs and nodes change depending on the spanning-tree (ST) topology then efficiency of CFM could be increased. That is, intermediate MEPs and nodes process information from the CCM that was snooped.

In this example, improvement with respect to snooping method is (8−6)/6*100=33.33%.

In general the improvement with respect to snooping method is (N−number_of_MEPs_at_the_edge_of ST)/number_of_MEPs_at_the_edge_of ST*100%.

For a hub and spoke service-network, the improvement would be minimum and equal to 100/(N−1) %. Note that there is always positive improvement.

Question 1: Is it possible to achieve the improvement of Example 1? That is, is it possible to achieve improvement of (N−2)/2*100% always?

Yes. And our invention is a method to achieve the above said improvement. We claim that with our method it is always possible to achieve improvement of (N−2)/2*100% over Legacy CFM (IEEE 802.1ag).

Every service-node or MP (MIP or MEP) sends CCM to only its neighbouring service-node or MPs. A fault is detected only if a service-node does not receive CCM from its neighbours. In the event of failure, the service-nodes on either side of the fault location shall notify all nodes of the network or only the service-nodes that are reachable. Every service-node has all the information about the traffic-flow or service that flows through it. Every service-node maintains a table of a traffic-flow mapped with ingress and egress port information. We claim that, using this table it is possible to pro-actively notify all relevant service-nodes about the fault and thus further reducing fault notification traffic.

In our invention, service-nodes don't probe to find out the fault location. They are pro-actively notified by the service-nodes on the either side of the fault location. So we claim that our method further reduces the LTM and LBM traffic that is initiated by all relevant service-nodes or MPs.

Now we consider the improvement achievable by this novel CFM mechanism. As every service-node is concerned about the reacheability of the neighbouring service-nodes, the traffic along any link is precisely 1 CCM, one each in each direction of the link. Irrespective of the spanning tree, there is always 1 CCM exchanged between a pair of service-nodes, one each in each direction. The implication of this statement is: if every node has a module to process CCM messages then with exactly 1 CCM, one each in each direction, fault can be monitored. We present the function of this module as a flow-chart.

As the service-network complexity increases or as the number of nodes increases, the bandwidth used by CFM is always constant over any link. And this improvement in bandwidth could be used for more revenue generation or for increasing the frequency of CCM leading to faster fault detection. We claim that this is the first time that a trade-off between speed of restoration and CCM bandwidth has been used within the context of CFM in the realm of Carrier Ethernet. We call this Fast Connectivity Fault Management, Fast-CFM. And we call this CCM as Fast-CCM.

We claim that our method detects, isolates, and notifies all or relevant MPs about node or link failure with minimal link bandwidth utilization.

Misconfiguration is handled by two processes:

Service set-up: Whenever a service is to be setup between two MEPs, all relevant MPs are configured with necessary service parameters and then an explicit Service set-up message is passed between the edge MPs (MEPs). This Service set-up message will freeze the service parameters at every MPs and prevent change of configuration of service parameters manually. In order to change any service parameters, the administrator has to send Service tear-down message.

Service tear-down: If a service parameter is to be updated or modified, then administrator shall send Service tear-down message between the edge MPs (MEPs). After exchange of Service tear-down message, the administrator is allowed to modify the service parameters.

These two messages prevent any accidental misconfiguration due to negligence on the part of the administrator.

MEF Service Examples

Given below are three examples of our invention within the context of MEF services. It should be noted that our invention is not restricted to only MEF services. Our invention has general applicability in wider scenarios.

Example 1

FIG. 3 shows a scenario with two flows, one between customer network C1 and C3, and the other between C2 and C3. Service is identified with S-VLAN IDs within the service provider network. Flow C1-C3 is mapped with S-VLAN ID with value 's1'. Flow C2-C3 is mapped with 's2'. s1 and s2 are two service-networks shown in this figure.

All ports are numbered as shown in FIG. 4. If a link 4-7 fails, then ports 4 and 7 will not receive Fast-CCM messages within the stipulated time internal. Port 4 will pro-actively notify all member-ports of 's1' and 's2'. That is, port 4 will notify port 1 and 3 about the fault. Similarly port 6 will pro-actively notify port 11 about the fault. This is possible because S-VLAN IDs are traceable upto the UNIs through their respective service-network.

After fault is notified, mechanism to recover from fault is triggered. Notice that in this example only relevant ports are notified about the fault. It is also possible to pro-actively notify all ports of all MPs as mentioned earlier in this document.

Example 2

Misconfiguration

In this example we will demonstrate how Service set-up and Service tear-down is used to prevent misconfiguration. The example shows misconfiguration of 's1' in FIG. 5. User forgets to set S-VLAN 's1' on port 4 or he types it wrongly. After configuring every relevant port, he sends Service set-up message from port 1 to port 11. But before the Service-set-up message reaches port 4 the message encounters misconfiguration. The administrator is then notified about the misconfiguration. After the correction, user will send Service set-up successfully. Once successful, the acknowledgement will freeze the service parameters. It won't be possible to change any service parameters. In order to change the parameters, user will use Service tear-down message. Service tear-down message will unfreeze the relevant service parameters. Traffic will stop flowing until service parameters are not frozen or hard coded. Automatic sending of Service set-up and tear-down is not allowed. Only automatic and manual parameter configuration is allowed.

Interoperability with Legacy CFM: There are two ways to interoperate with legacy CFM: 1) S-VLAN one-to-one mapping and 2) S-VLAN tunneling. FIG. 6 shows a scenario where our invention, Fast-CFM (in domain D2) is sandwitched between two Legacy CFM networks (D1 and D3). Ports 1 and 4 understand only Legacy CFM whereas ports 2 and 3 understand both Legacy CFM as well as Fast-CFM.

One-to-one mapping: In this method, the edge ports need capabilities to understand both legacy CCM as well as the Fast-CCM. Legacy CCM will be terminated on the edge ports 2 and 3, and they will not be carried through Inner Domain, D2. Ports 1 and 2 (and ports 3 and 4) exchange Legacy CCMs. Any fault within D2 will be pro-actively notified to port 2 and port 3. This fault notification will not be transmitted to ports 1 and 4 because as per Legacy CFM, a fault will stop CCM traffic. So, ports 2 and 3 will stop sending Legacy CCM into D1 and D3. This stoppage of Legacy CCM will trigger detection, isolation and notification process within D1 and D3.

Similarly, if a fault occurs in D1 then port 2 will trigger detection, isolation and notification as per Legacy CFM within D1. Port 2 would have to notify port 3 about the fault detection and instruct it to not send any more Legacy CCMs to port 4. Port 3 will not notify port 4 about the fault. It will simply stop sending Legacy CCMs to port 4. So port 4 will trigger detection, isolation and notification process by exchanging Legacy CCMs with port 3. As soon as port 2 learns about the exact fault location it will send fault notification message to all relevant nodes within D2. Port 3 will then notify port 4 about the exact fault location.

Within D2, VLAN translation could also be used.

Tunneling: In this method, Legacy CCMs from D1 will be tunneled transparently to D3. Now S-VLAN stacking will be effected at ports 2 and 3. If stacking takes place at port 2 then de-stacking will take place at port 3, and vice-versa.

Fast CFM flow-chart: (FIG. 7)
1. Service node exchanges Fast-CCM with adjacent service nodes through service ports
2. Service node does not forward the Fast-CCM received from adjacent service-nodes
3. Service node terminates all the received Fast-CCM
4. Service node checks if specified number of Fast-CCM was received, within a specified time interval, from each adjacent service node. If not, then it pro-actively notifies fault to all service ports of the service network
5. Service node can also pro-actively notify fault to all ports of the network.
6. Service node fault notification is received then it takes appropriate actions as per SLA: e.g. drop or re-route the service
7. Service node handles non-Fast-CFM frames or Data frames as per SLA
8. Service node interoperates with .1ag CFM network as mentioned in the section titled Interoperability with Legacy CFM

GLOSSARY

MEP: Maintenance Association End Point
MD: Maintenance Domain
CFM: Connectivity Fault Management (IEEE 802.1ag)
CCM: Connectivity Check Message
VLAN: Virtual Local Area. Network
C-VLAN: Customer VLAN tag S-VLAN: Service Provider VLAN tag
UNI: User Network Interface
NNI: Network Network Interface
I-UNI: Ingress UNI port
E-UNI: Egress UNI port
MEF: Metro Ethernet Forum
MP: Maintenance Points
MIP: Maintenance Domain Intermediate Point
ID: Identifier
LTM: Link Trace Message
LTR: Link Trace Reply
LBM: Loop Back Message
LBR: Loop Back Reply

The invention claimed is:

1. A method for fast Connectivity Fault Management (CFM) of a service-network comprising a plurality of edge service-nodes and intermediate service-nodes in the realm of Carrier Ethernet, comprises steps of:
   a) learning a spanning tree topology of the service-network;
   b) exchanging fast Connectivity Check Messages (Fast-CCM)s between adjacent intermediate service-nodes of the spanning tree;
   c) detecting a fault in the service-network if the fast CCM is not received by the adjacent intermediate service-nodes within pre-specified time intervals;
   d) terminating process of exchanging the Fast CCMs between the adjacent intermediate service-nodes upon detecting the fault in the service network;
   e) generating two notification messages, wherein one of the two notification messages is generated by the adjacent intermediate service node located on one side of the fault in the service network and other notification message is generated by another adjacent intermediate service node located on another side of the fault in the service network; and
   d) pro-actively notifying each service-node in the service network about the fault in the service network, by the adjacent intermediate service-nodes located on either side of the fault in the service network, by sending the two notification messages, wherein the adjacent intermediate service node located on one side of the fault in the service network directly sends one of the two notification messages to one or more services nodes reachable by the adjacent intermediate service node and another adjacent intermediate service node located on another side of the fault in the service network directly sends the another notification message to one or more service nodes reachable by the another adjacent intermediate service node.

2. The method as claimed in claim 1, wherein one fast CCM is exchanged at any point of time, within a specified time-interval, between two intermediate service-nodes in the service network.

3. The method as claimed in claim 1, the wherein adjacent intermediate service nodes on either side of the detected fault location provide the notification pro-actively to other service-nodes in the service-network affected due to the fault.

4. The method as claimed in claim 1, wherein the notification is provided using a service-node table configured in each of the service-nodes for traffic flow.

5. The method as claimed in claim 1, wherein the method provides for detection, isolation and notification of a node and/or link failure to the service-nodes affected due to the node and/or link failure.

6. The method as claimed in claim 1 further provides interoperability with known CFM, IEEE 802.1ag.

7. The method as claimed in claim 1, further providing reduced Link Trace Message (LTM) and Loop Back Message (LBM) traffic than that of IEEE 802.1ag to recover from the fault in the service-network.

8. The method as claimed in claim 1, wherein the method increases the speed of recovery with minimal bandwidth usage compared to IEEE 802.1ag.

9. A Carrier Ethernet bridge system comprising a service-network having a spanning tree topology and comprising a plurality of edge service-nodes and intermediate service-nodes, wherein each of the intermediate service-nodes is configured to:
   a) learn a spanning tree topology of the service-network;
   b) exchange fast-Connectivity Check Messages (CCMs) between adjacent intermediate service-nodes of the spanning tree;
   c) detect a fault in the service-network if the fast-CCM is not received by the adjacent intermediate service-nodes within pre-specified time intervals;
   d) terminate process of exchanging the Fast CCMs between the adjacent intermediate service-nodes upon detecting the fault in the service network;
   e) generate two notification messages, wherein one of the two notification messages is generated by the adjacent intermediate service node located on one side of the fault in the service network and other notification message is generated by another adjacent intermediate service node located on another side of the fault in the service network; and
   f) pro-actively notify each service-node in the service network about the fault in the service network, by the adjacent intermediate service-nodes located on either side of the fault in the service network, by sending the two notification messages, wherein the adjacent intermediate service node located on one side of the fault in the service network directly sends one of the two the notification messages to one or more services nodes reachable by the adjacent intermediate service node and another adjacent intermediate service node located on another side of the fault in the service network directly sends the another notification message to one or more service nodes reachable by the another adjacent intermediate service node.

10. The Carrier Ethernet bridge system according to claim 9, wherein each said adjacent intermediate service-node includes hardware and a computer program product stored on non-volatile memory including instructions that, when implemented by any one of the plurality of intermediate service-nodes, cause the service-node to perform steps a) to f).

11. The system according to claim 9, wherein each said adjacent intermediate service-node includes a service-node table which implements said proactive notification of the fault in the service network.

* * * * *